United States Patent [19]
Gallup

[11] 3,863,605
[45] Feb. 4, 1975

[54] METHOD FOR PROVIDING COOLED AERATED WATER

[76] Inventor: Leslie E. Gallup, Box 116, Morrisville, N.C. 27560

[22] Filed: Oct. 1, 1973

[21] Appl. No.: 402,632

[52] U.S. Cl. .................................. 119/3, 165/45
[51] Int. Cl. ............................................ A01k 63/00
[58] Field of Search .......................... 119/2–5; 165/45

[56] References Cited
UNITED STATES PATENTS

| | | | |
|---|---|---|---|
| 3,473,509 | 10/1969 | Miyamura | 119/3 |
| 3,618,569 | 11/1971 | Baer | 119/3 X |

Primary Examiner—Louis G. Mancene
Assistant Examiner—J. N. Eskovitz
Attorney, Agent, or Firm—Mason, Fenwick & Lawrence

[57] ABSTRACT

A body of water is disclosed having a conduit extending through its deeper portion to an inlet near its upper surface portion and a discharge end discharging into a separate storage means so that oxygen-rich warm water enters said inlet and flows along the length of said conduit to be cooled by cooler oxygen-poor water in the deeper portions of said body of water for discharge as cooled oxygen-rich water into said storage means. In different embodiments of the invention, flow through the conduit is effected by siphon action and by the operation of a pump positioned in the conduit.

6 Claims, 4 Drawing Figures

PATENTED FEB 4 1975　　　　　　　　　　　　　　　3,863,605

METHOD FOR PROVIDING COOLED AERATED WATER

This invention is in the field of aquaculture and is specifically directed to the field of controlled fish growing and maintaining systems. Even more specifically, the subject invention is directed to a trout growing system which enables the maintenance of water conditions suitable for the growth of trout year round in climates normally incapable of providing adequately low water temperatures in combination with sufficiently high levels of oxygen in the water in which the trout are maintained.

The growth of trout and other fish in controlled environments presents a number of problems in maintaining proper temperature and oxygen content in the water in which the trout are maintained. Specifically, trout are extremely delicate creatures and it is necessary that the water in which they are kept be maintained at a temperature in the range of 33° to 70°F while the oxygen content of the water must be maintained at at least five parts per million of dissolved oxygen. Moreover, more delicate species require even lower maximum temperatures and greater dissolved oxygen content in their water environment.

In cooler climates and seasons, it is possible to maintain the required oxygen content in trout raising impoundments by the operation of fountain type aeration equipment which provides a continuous spray of water into the atmosphere above the particular impoundment and/or by the operation of aerators which bubble air upwardly through the water from the deeper portions of the impoundment. Unfortunately, devices of the aforementioned type, while always providing the maintenance of an adequate oxygen content in the water, do not function satisfactorily in hotter climates since they increase the water temperature beyond allowable limits. Specifically, when a spray system is employed in a hotter climate, the contact of the warm air with the water raises the water temperature beyond a satisfactory level for growing trout and the same results are true of the systems in which the air is bubbled upwardly through the water in the impoundment.

Many parts of the country have a climate which will provide a satisfactory temperature and oxygen condition in ponds or lakes for the growth of several species of trout for all but the two or three hottest months of the year. The Piedmont area of North Carolina and Virginia exemplifies two such areas in which trout could be grown in many natural or artificial ponds during most months of the year. This invention is directed to a system and method of enabling the growth of trout during all months of the year in such borderline areas.

Therefore, it is the primary object of this invention to provide a new and improved system and method for oxygenating and cooling water.

A more specific object of this invention is the provision of a system and method capable of oxygenating and cooling water in which trout are kept for maintaining the growth of trout in geographical areas in which such growth is not capable of being maintained during the hotter months of the year.

Achievement of the foregoing objects is enabled through means relying upon the known facts that during the hotter summer months, water bodies tend to stratify with respect to oxygen content and temperature so that water near the surface of the body of water is oxygen-rich and at a high temperature while water at the lower depths of such bodies of water is oxygen-poor and at a much lower temperature. The lower temperature of the deeper portion of such bodies of water is substantially below the maximum temperature at which trout can survive but does not have adequate dissolved oxygen content for trout survival. In fact, measured water temperature in the deeper portions of ponds in the Piedmont area of North Carolina will average approximately 50°F. notwithstanding the fact that water near the surface can approach 90°F. in the hotter months.

More specifically, achievement of the foregoing objects is enabled through the provision of a first body of water of substantial size and depth which can either be a natural or manmade pond or lake having a temperature and oxygen distribution as discussed above and a second smaller impoundment adjacent to the larger body of water but separate and distinct therefrom. A conduit formed of material with high heat transfer capacity is provided in the first body of water with the conduit having a substantial heat exchange portion of its length in the deeper portions of the first body of water in which the water temperature is substantially less than the ambient temperature. An inlet is provided in the conduit adjacent the surface of the first body of water for enabling the inflow of oxygen-rich warm surface water into the conduit. The heat exchange portion of the conduit extends to a discharge end positioned to discharge into the smaller impoundment and means are provided for causing water to flow into the inlet of the conduit, through the heat exchange portion of the conduit and outwardly through the discharge end into the smaller impoundment. Flow of the oxygen-rich water from the surface portions of the large body of water into and through the conduit results in a cooling of the water by the cooler oxygen-poor water surrounding the heat exchange portions of the conduit in the deeper portions of the larger body of water so that cooled oxygen-rich water is discharged from the conduit into the smaller impoundment. The cooled oxygen-rich water is at a sufficiently low temperature and a sufficiently high oxygen content as to permit the concentrated growth and maintenance of trout in the smaller impoundment during the hotter months of the year. In many instances, the trout could be started in the smaller impoundment and transferred to the large impoundment during the cooler months.

Flow of the water into and through the conduit is enabled in one embodiment by the employment of a pump in the conduit. In another embodiment, the flow is effected by a natural siphon action due to the fact that the discharge end of the conduit and the surface of the smaller impoundment are positioned below the level of the inlet of the conduit and the surface of the large body of water. The amount of water flowing through the conduit, and the consequent temperature of water discharged from the conduit, is varied by the employment of valve means in the conduit for adjusting the flow rate therethrough.

A better understanding of the manner in which the subject invention achieves the objects of this invention will be enabled when the following written description is read in conjunction with the appended drawings in which.

Figure 1:
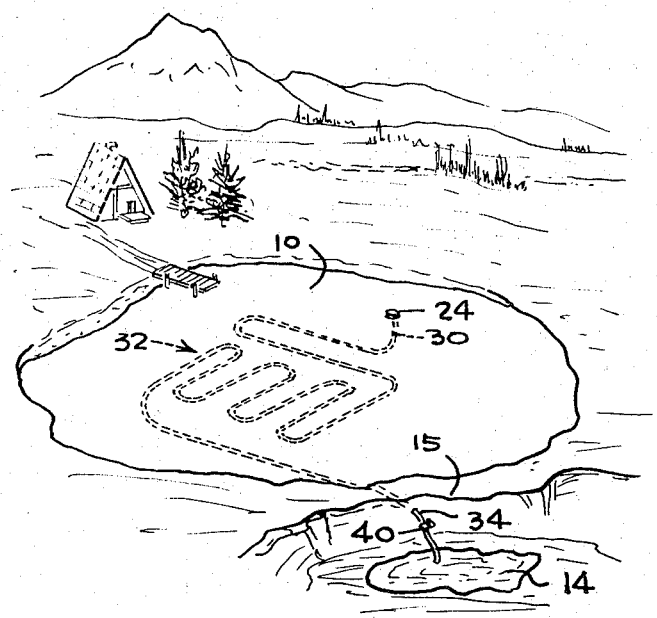
FIG. 1 is a perspective view of one embodiment for practice of the inventive system and method.
Figure 2:
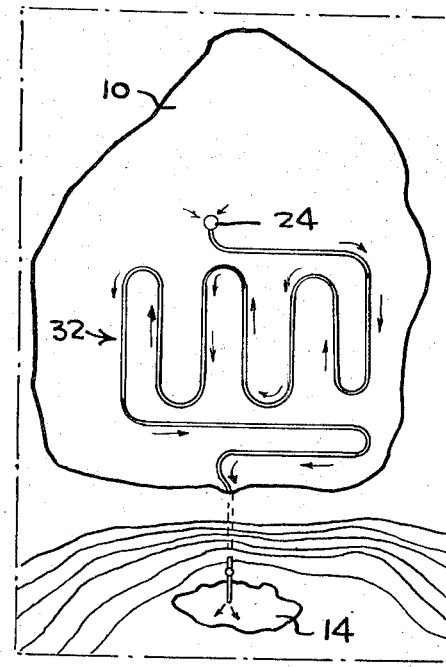
FIG. 2 is a plan view of the embodiment illustrated in FIG. 1.
Figure 3:
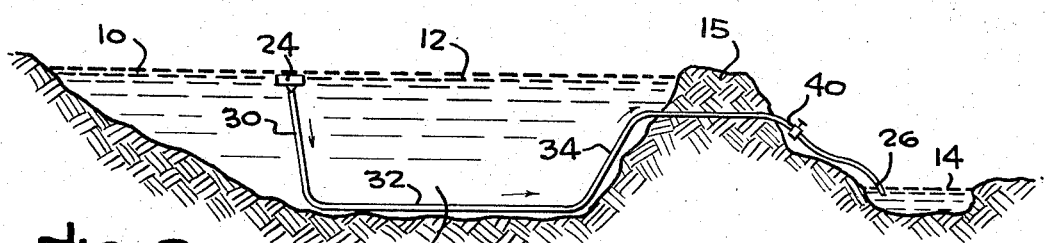
FIG. 3 is a side elevation view of a portion of the preferred embodiment illustrated in FIGS. 1 and 2.

Turning now to FIGS. 1 through 3 of the drawings, a relatively large body of water 10 is provided and can either be a natural or an artificial lake or other impoundment which has sufficient depth to provide a deeper portion 11 in which the water temperature will remain at a low level during all months of the year with the upper surface portions 12 of the relatively large body of water being substantially warmer.

Water in the upper surface 12 of the body of water 10 contains a large amount of dissolved oxygen and it is therefore oxygen-rich while the water in the deeper portion 11 is oxygen-poor but is at a temperature substantially below both the temperature of the water in the surface portion 12 and the temperature necessary for the maintenance of trout in the water.

A small impoundment 14 is positioned adjacent to the relatively large body of water 10 but is separated therefrom by a dam or other barrier 15 as best shown in FIG. 3. A conduit is provided in communication between the large body of water 10 and the smaller impoundment 14 with the conduit including an inlet 24 positioned in the upper surface portion 12 adjacent the surface of the body of water 10. In addition, an outlet 26 of the conduit is positioned to discharge into the small impoundment 14 which has a surface below inlet 24.

Inlet 24 is connected by a connecting portion 30 of conduit to an elongated portion 32 of the conduit positioned in the deeper portions 11 of the body of water 10. The portion 32 of conduit in effect comprises a heat exchange portion in that portion 32 is of substantial length so that water flowing through it is in heat exchange relationship with the cooler water in the deeper portion 11 of the body of water for a substantial time period and is consequently cooled by the cooler surrounding water. Cooled high oxygen content water leaves the heat exchange portion 32 of the conduit by means of a downstream connector portion 34 extending from the heat exchange portion to outlet 26 as best shown in FIG. 3.

If the surface level of the body of water 10 should tend to fluctuate, inlet 24 can be mounted on a float and connecting portion 30 formed of flexible plastic tuling or the like.

Since the smaller impoundment 14 is located at a lower level than the surface of the large body of water 10, natural siphon action enables the flow of water into the inlet 24, the connecting portion 30, the heat exchange portion 32, the downstream connector portion 34 and the outlet 26. The amount of flow through the conduit is easily adjusted by a valve 40 conveniently located in the downstream portion of the conduit.

Therefore, it will be seen that the oxygen-rich water in the upper portion 12 of the body of water 10 is moved into the conduit to flow into heat exchange relationship in the portion 32 with respect to the cooler oxygen-poor water in the portion 11 of the body of water 10. The warmer oxygen-rich water is consequently cooled to a satisfactory lower level so that it can be discharged into the smaller impoundment 14 to maintain adequate temperature and oxygen condition in the smaller impoundment for the confined growth and maintenance of trout during the months of the year in which such would not be possible in the large impoundment 10.

If the large impoundment 10 is of such a nature as to permit the harvesting and transfer of trout from the large body of water 10, the large body of water could be employed for raising trout during the cooler months of the year.

Figure 4:
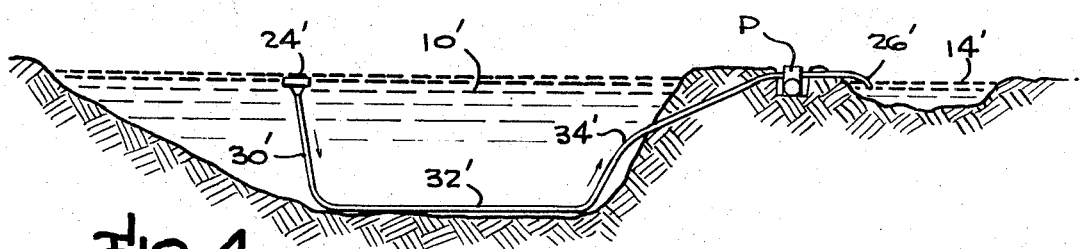
FIG. 4 is a side elevation view of another embodiment for practice of the subject invention.

FIG. 4 illustrates a second embodiment of the invention which is closely similar to the above-described first embodiment and is illustrated with primed designators corresponding to like elements of the first embodiment. The second embodiment includes a large body of water 10' and a small impoundment 14' with the main differences being that the small impoundment 14' is at or near the same level as the large body of water 10'. Consequently, siphon action cannot be relied upon for effecting the movement of water into the inlet 24' to flow through the heat exchange portion 32' of the conduit positioned in the large body of water 10'. Therefore, a pump P is mounted in the conduit for achieving flow through the conduit and discharge via outlet 26' into the small impoundment 14'. In all other respects, operation of the second embodiment is identical to that of the first embodiment.

While many modifications of the embodiments illustrated herein will undoubtedly occur to those of skill in the art, it should be understood that the spirit and scope of the invention is to be limited solely in light of the appended claims.

I claim:

1. A method of providing a quantity of water having a high oxygen content and a relatively low temperature from a body of water having oxygen-rich warm water near its surface and oxygen-poor cooler water in its deeper portions, said method comprising the steps of taking quantities of said oxygen-rich warm water from near the surface of said body of water and moving said quantities of oxygen-rich warm water into heat exchange relationship with the cooler oxygen-poor water in said body of water without intermixing the oxygen-rich warm water with the oxygen-poor cooler water so that said oxygen-rich water is cooled below its original temperature wherein said oxygen-rich warm water is moved into heat exchange relationship with said oxygen-poor cooler water by causing said oxygen-rich warm water to flow into the end of a conduit positioned in said oxygen-rich warm water and causing said oxygen-rich warm water entering said conduit to flow to and through a substantial length of said conduit positioned in said oxygen-poor cooler water so that heat in said oxygen-rich warm water in said conduit flows through the walls of said conduit into said oxygen-poor cooler water to consequently lower the temperature of said oxygen-rich water to provide cooled oxygen-rich water and further including the step of discharging said cooled oxygen-rich water from said conduit into storage means subsequent to the cooling of said oxygen-rich water in said conduit.

2. The method of claim 1 wherein said cooled water discharged from said conduit is at a temperature of less than 70°F and has an oxygen content of at least five parts per million.

3. The method of claim 1 wherein said oxygen-rich warm water is moved into heat exchange relationship with said oxygen-poor cooler water by causing said oxygen-rich warm water to flow into the end of said conduit positioned in said oxygen-rich warm water by the operation of pump means in said conduit with said pump means causing said water entering said conduit to flow to and through said substantial length of said conduit positioned in said oxygen-poor cooler water so that heat in said oxygen-rich water in said conduit flows through the walls of said conduit into said body of cooler oxygen-poor water to consequently lower the temperature of said oxygen-rich water and with said pump means also causing said discharging of said cooled oxygen-rich water into said separate storage means subsequent to the cooling of said oxygen-rich water in said conduit.

4. The method of claim 3 wherein said cooled water discharged from said conduit is at a temperature of less than 70°F and has an oxygen content of at least five parts per million.

5. The method of claim 1 wherein said movement of said oxygen-rich warm water into the end of said conduit positioned in said oxygen-rich warm water and movement of said warm water entering said conduit to flow to and through a substantial length of said conduit positioned in said oxygen-poor cooler water so that heat in said warm oxygen-rich water in said conduit flows through the wall of said conduit into said body of cooler oxygen-poor water to consequently lower the temperature of said oxygen-rich water and said discharging of said water from said conduit into a separate storage means is effected by a siphon operation wherein said storage means has a water surface below the surface of said body of water.

6. The method of claim 5 wherein said cooled water discharged from said conduit is at a temperature of less than 70°F and has an oxygen content of at least five parts per million.

* * * * *